(No Model.) 5 Sheets—Sheet 3.

J. H. PATERSON.
SCREW CUTTING LATHE.

No. 506,068. Patented Oct. 3, 1893.

WITNESSES:
C. Neveux
C. Sedgwick

INVENTOR
J. H. Paterson
BY
Munn & Co
ATTORNEYS.

(No Model.)

J. H. PATERSON.
SCREW CUTTING LATHE.

No. 506,068. Patented Oct. 3, 1893.

WITNESSES:
C. Neveux
C. Sedgwick

INVENTOR
J. H. Paterson
BY
Munn & Co
ATTORNEYS.

UNITED STATES PATENT OFFICE.

JAMES HERBERT PATERSON, OF INGERSOLL, CANADA.

SCREW-CUTTING LATHE.

SPECIFICATION forming part of Letters Patent No. 506,068, dated October 3, 1893.

Application filed May 13, 1893. Serial No. 474,137. (No model.)

*To all whom it may concern:*

Be it known that I, JAMES HERBERT PATERSON, a subject of the Queen of Great Britain, residing at Ingersoll, in the Province of Ontario and Dominion of Canada, have invented a new and Improved Screw-Cutting Lathe, of which the following is a full, clear, and exact description.

The object of the invention is to provide a new and improved screw cutting lathe, which is simple and durable in construction, very effective in operation and arranged to permit the operator to easily and quickly bring the cutting tool back to the exact position on the beginning of the cut, so that a perfect and uniform thread is quickly produced and no time whatever is lost by the operator being compelled to find the beginning of the cut, as is necessarily the case with screw cutting lathes, as now constructed.

The invention consists principally of a mechanism intermediate of the spindle and the feed shaft, and comprising an auxiliary shaft driven from the moving carriage and geared with the feed shaft in such a manner as to cause the latter to rotate at a higher or lower rate of speed than that otherwise given to the feed shaft from the spindle.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Fig. 3 is an end elevation of the same.

The improved screw cutting lathe is provided with the usual bed A, supporting on one end the head stock B, in which is mounted in the usual manner, the spindle B' engaging at one end the work C, held at its other end in the mandrel $B^2$ of the tail stock $B^3$ of the usual construction. The cutting tool C' for operating on the work C is mounted in the usual tool holder $C^2$ held transversely-adjustable on the carriage D mounted to slide longitudinally in suitable bearings on the bed A.

Figure 5:
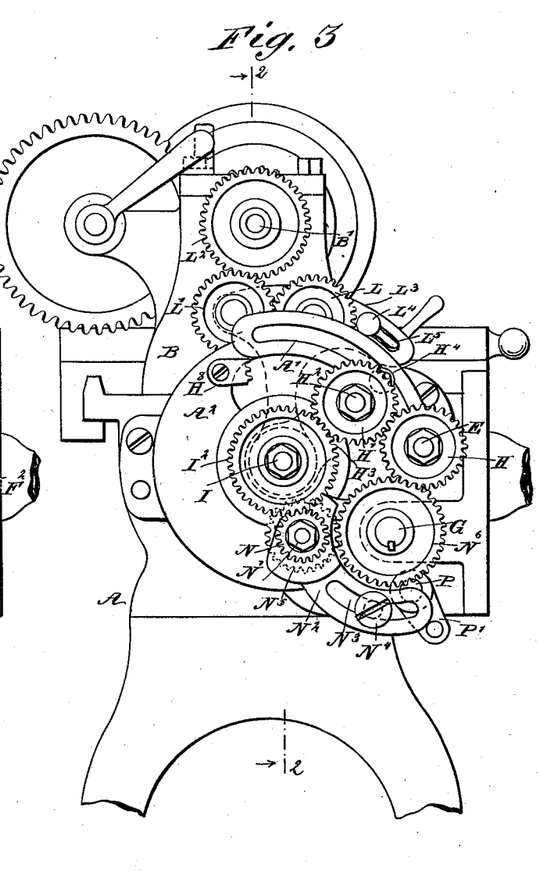
Fig. 5 is an inverted plan view of the improvement.
Figures 5, 6, 7, 8:
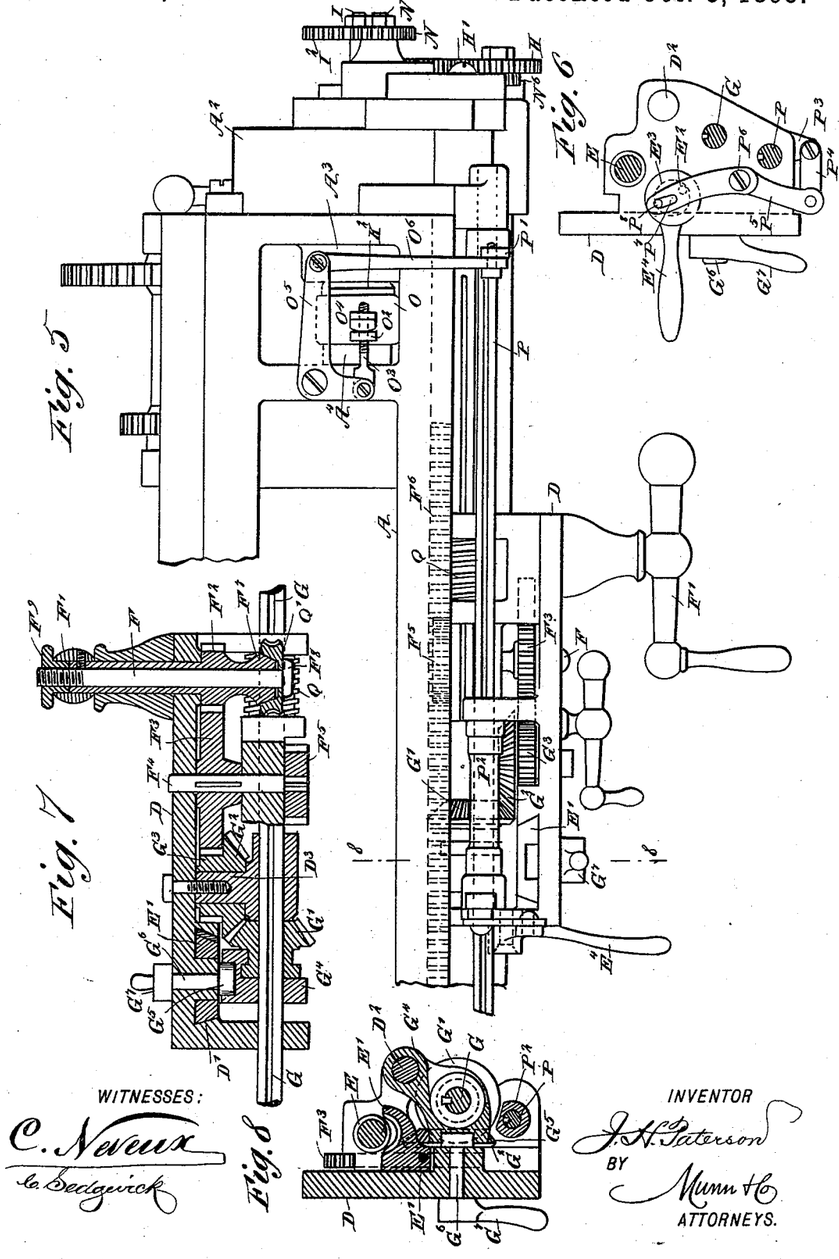
Fig. 6 is an end elevation of the carriage with the shafts in section.
Fig. 7 is a sectional plan view of the same on the line 7—7 of Fig. 2.
Fig. 8 is a cross section of the same on the line 8—8 of Fig. 5.
Figure 10:
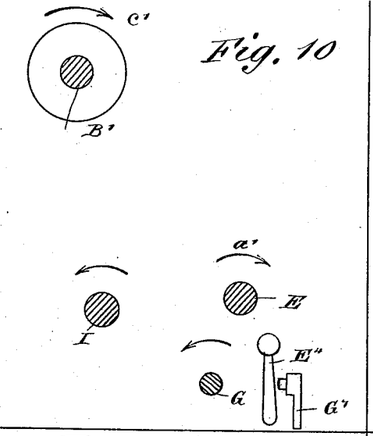
Figs. 10, 11, 12 and 13, are diagrammatic views illustrating the position and movement of the several shafts connected with the carriage.

Through the front of the carriage D passes the longitudinally-extending feed shaft E, journaled in suitable bearings arranged on the ends of the bed A, as plainly illustrated in the drawings. The feed shaft E is adapted to be engaged by a half nut E'; see Figs. 7 and 8, mounted to slide vertically in suitable bearings D' formed on the inside of the carriage D, the said half nut being moved up into engagement with the feed shaft E, or down, out of engagement with the same by a pin $E^2$ projecting from the nut and engaging eccentrically a hub $E^3$ mounted to turn in suitable bearings in the right hand end of the carriage D as plainly shown in Fig. 6. On the outer end of this hub $E^3$ is secured a handle or lever $E^4$ under the control of the operator so that the latter is enabled by moving the handle downward to impart an upward sliding motion to the half nut E', to engage the latter with the feed screw E. When the handle is moved into a horizontal position, then the pin $E^2$ is in a lowermost position, as shown in Fig. 6, and consequently the half nut E' is in a like lowermost position and out of engagement with the feed shaft. Thus, when the latter is rotating in the direction of the arrow a' shown in Figs. 10, 11 and 12, and the half nut E' is in engagement with the said feed shaft then the carriage D moves from the right to the left, but when the said half nut is out of engagement with the feed shaft, the carriage D is not moved by the feed shaft in the direction mentioned.

Figure 1:
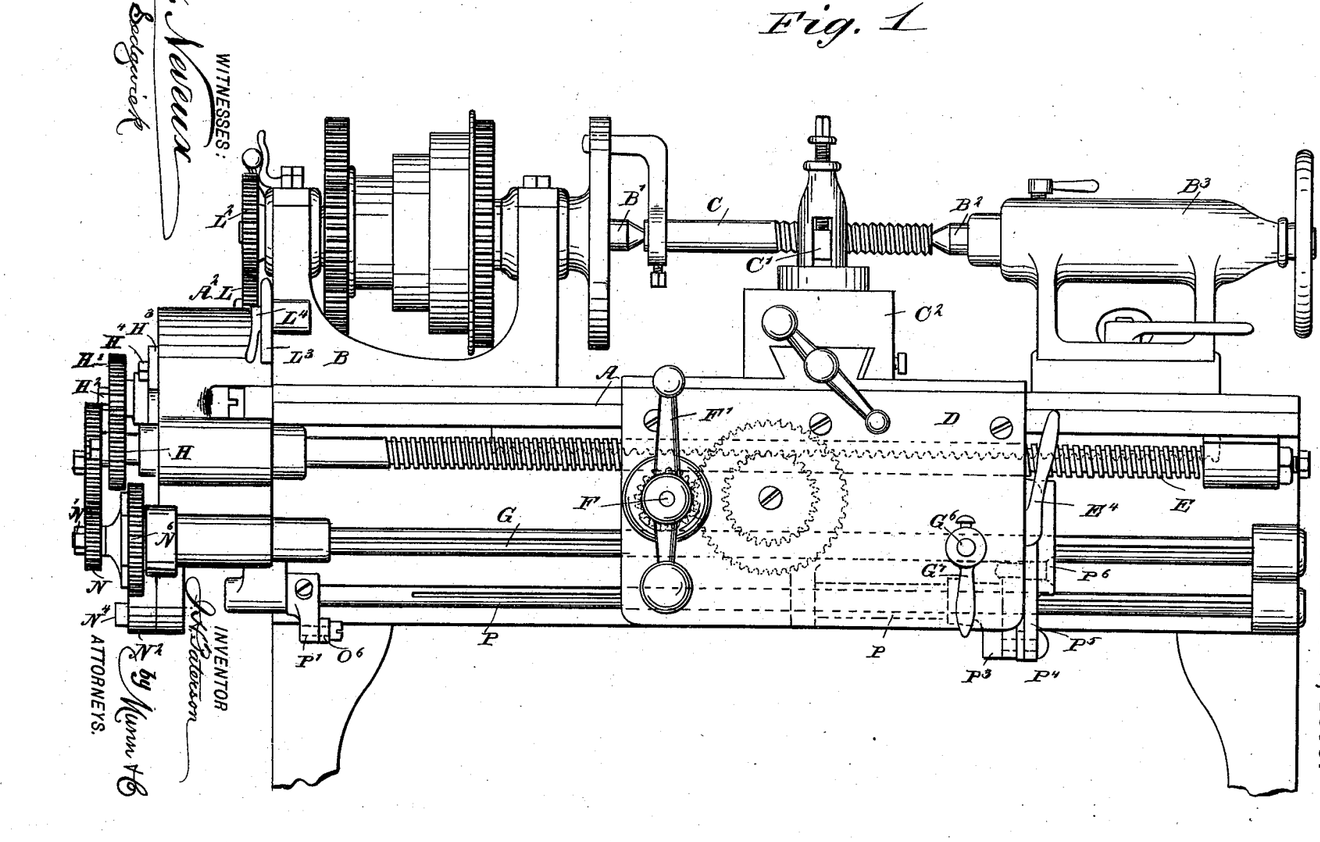
Figure 1 is a front elevation of the improvement.
Figure 13:
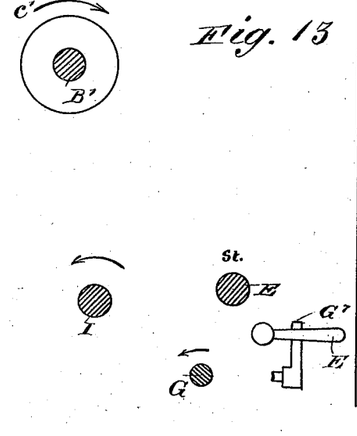

In order to move the carriage D by hand at the time the half nut E' is out of engagement with the feed shaft E, the following device is provided: In the carriage D is arranged a transversely-extending shaft F carrying at one outer end a handle F' under the control of the operator for turning the said shaft whenever desired. On the inner end of the shaft F is secured a pinion $F^2$ in mesh with a gear wheel $F^3$ secured on a short shaft $F^4$, mounted to turn in suitable bearings in the carriage D. On the inner end of the shaft $F^4$ is secured a gear wheel $F^5$, in mesh with a rack $F^6$ secured on the bed A in the rear of the feed shaft E, as plainly shown in Fig. 5, and part of Fig. 2. Thus, when the half nut E' is out of mesh with the feed shaft E, the operator, on turning the handle F' can impart a forward or backward sliding motion to the carriage D, as the gear wheel $F^5$ rolls off on the fixed rack $F^6$. But when the half nut E' is in mesh with the feed shaft E, and the latter is rotated from the spindle B' as hereinafter more fully described, then the motion given to the carriage D, causes the gear wheel $F^5$ to turn by rolling off the fixed rack $F^6$. The shaft $F^4$ carrying this gear wheel $F^5$ is adapted to be connected with a longitudinally extending auxiliary shaft G, journaled in suitable bearings on the side of the bed A below the feed shaft E. This shaft G, forms a principal part of the intermediate mechanism for controlling the speed of the feed shaft E to permit of cutting any desired number of threads to the inch on the work, the number not necessarily being a multiple of the number of threads per inch of the feed shaft E. To drive the shaft G from the shaft $F^4$, I provide the said shaft G, with a beveled gear wheel G' mounted to turn with and to slide on the said shaft G, and adapted to be thrown in or out of mesh, with a bevel gear wheel $G^2$ mounted to rotate loosely on a stud $D^3$ forming part of the carriage D; see Fig. 7. On the hub of the bevel gear wheel $G^2$ is formed a pinion $G^3$ in mesh with the aforesaid gear wheel $F^3$, so that when the gear wheels G' and $G^2$ are in mesh with each other, and the shaft $F^4$ is rotated, then the said gear wheel $F^3$ rotates the pinion $G^3$ and the beveled gear wheel $G^2$ of the latter imparts a rotary motion to the beveled gear wheel G' held on the shaft G whereby the latter is rotated as soon as the carriage D commences to travel forward. When the beveled gear wheel G' is out of mesh with the gear wheel $G^2$ then the movement of the carriage D does not affect the said shaft G. The bevel gear wheel G' can be moved in or out of mesh with the bevel gear wheel $G^2$, and for this purpose I provide the hub of the bevel gear wheel G' with an annular recess engaged by a slide $G^4$ mounted to slide longitudinally in bearings $D^2$ forming part of the carriage D. In the slide $G^4$ is formed a recess engaged by an eccentric cam $G^5$ held on a transversely-extending short shaft $G^6$ mounted to turn in suitable bearings in the carriage D and carrying at its outer front end a handle $G^7$ under the control of the operator, (see Figs. 6, 7 and 8.) When the handle $G^7$ is in a lowermost position, as shown in Figs. 1, 6 and 8, then the bevel gear wheel G' is in mesh with the bevel gear wheel $G^2$ and when the operator throws the said handle $G^7$ into a vertical position indicated in Fig. 13, then the eccentric cam $G^5$ shifts the slide $G^4$ to the right, whereby the bevel gear wheel G' is moved out of mesh with the bevel gear wheel $G^2$ and consequently the shaft G is not affected by the movement of the carriage D, as previously mentioned, but on the contrary imparts a traveling motion to the carriage D as hereinafter more fully described.

Figure 4:
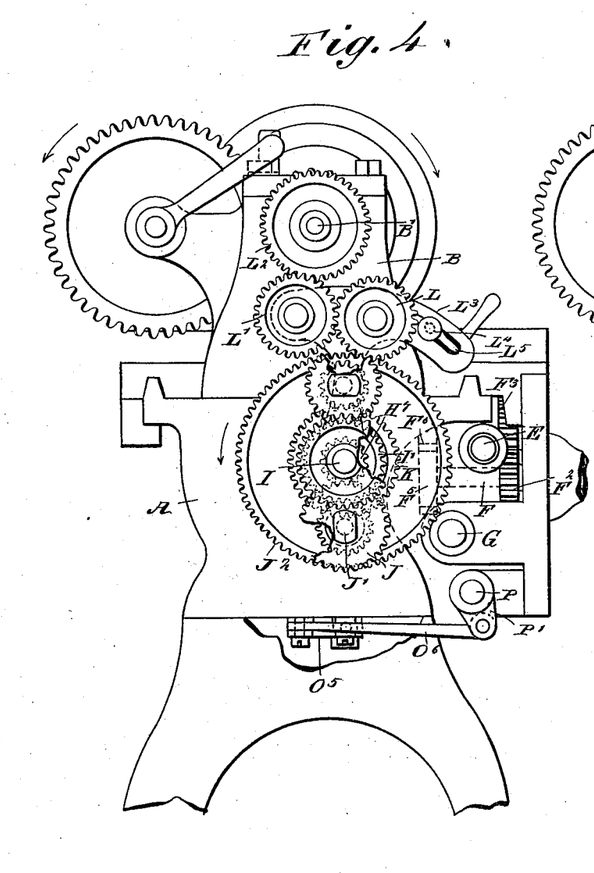
Fig. 4 is a similar view of the same with parts removed and parts broken out.
Figure 9:
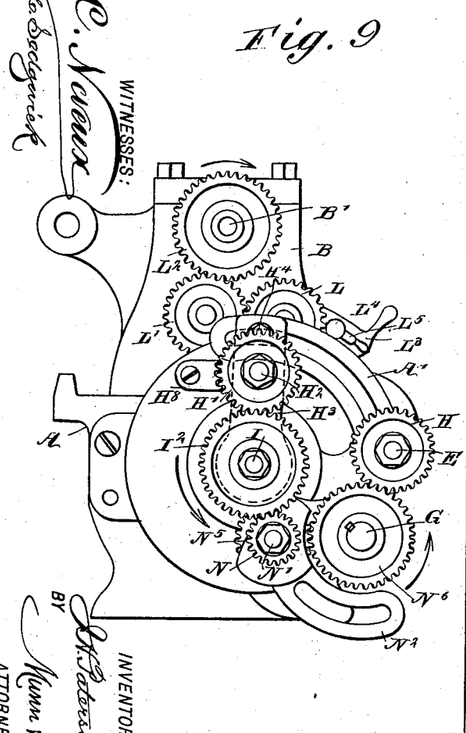
Fig. 9 is an end view of the head stock and adjacent parts.

In order to impart a rotary motion to the feed shaft E in the direction of the arrow $a'$, from the spindle B', the following device is provided. On the front end of the feed shaft E is secured a gear wheel H in mesh with a gear wheel H' secured on a short longitudinally-extending shaft $H^2$ mounted to turn in suitable bearings arranged in an arm $H^3$ fulcrumed loosely on a longitudinal shaft I journaled in the bed A, as plainly shown in Fig. 2. The arm $H^3$ is held adjustable by a bolt $H^4$ in a segmental slot A' of a casing $A^2$ secured on the front end of the bed A. By loosening the bolt $H^4$ and swinging the arm $H^3$ to the left, as illustrated in Fig. 9, the gear wheel H' may be moved out of mesh with the gear wheel H to prevent revolving of the feed shaft for the purpose hereinafter more fully described. Ordinarily, however, the gear wheels H and H' are in mesh, and on the inner end of the shaft $H^2$, carrying the said gear wheel H', is secured a gear wheel $H^5$ in mesh with a gear wheel $H^6$ mounted to rotate loosely on the before mentioned shaft I and carrying on its inner face a small pinion $H^7$ in mesh with a gear wheel J mounted to rotate on a stud J' secured to the face of a gear wheel $J^2$ (see Figs. 2 and 4) mounted to rotate loosely on the hub K' of a gear wheel K held loosely on the shaft I. On the face of the gear wheel J is formed a pinion $J^3$ in mesh with the gear wheel I' on shaft I. The large gear wheel $J^2$ is in mesh with a gear wheel L in mesh with an intermediate gear wheel L' meshing into a gear wheel $L^2$ secured on the outer end of the spindle B'. Thus, when the latter is rotated a rotary motion is given to the gear wheel $L^2$, which, by the gear wheels L' and L imparts a rotary motion to the large gear wheel $J^2$ and the latter, by pinion $J^3$ held on the stud J' of the said large gear wheel $J^2$ and rolling off on the gear wheel I' imparts a rotary motion to the pinion $J^3$ and gear wheel J and to the pinion $H^7$, so that its gear wheel $H^6$ rotates the gear wheel $H^5$ and consequently the shaft $H^2$ imparts a rotary motion to the gear wheel H on the feed shaft E. The gear wheels L and L' are journaled in a segmental arm $L^3$ fulcrumed loosely on the hub of the gear wheel $J^2$; see Fig. 2; the said segmental arm being adapted to be locked in place by a bolt $L^4$ passing through a segmental slot $L^5$ in the said arm $L^3$. When it is desired to cut left hand threads on the work C, the arm $L^3$ is shifted by first loosening the bolt $L^4$ and then moving the arm to the left to move the gear wheel L' entirely out of mesh with the gear wheel $L^2$ and the gear wheel L also in mesh with the gear wheel L². When the spindle B' is rotated a rotary motion in the inverse direction of the arrow a' is given to the feed shaft E to cut left hand threads on the work C. Ordinarily however, the gear wheels L², L', L and J² are in mesh as above described and shown in the drawings.

Figure 2:
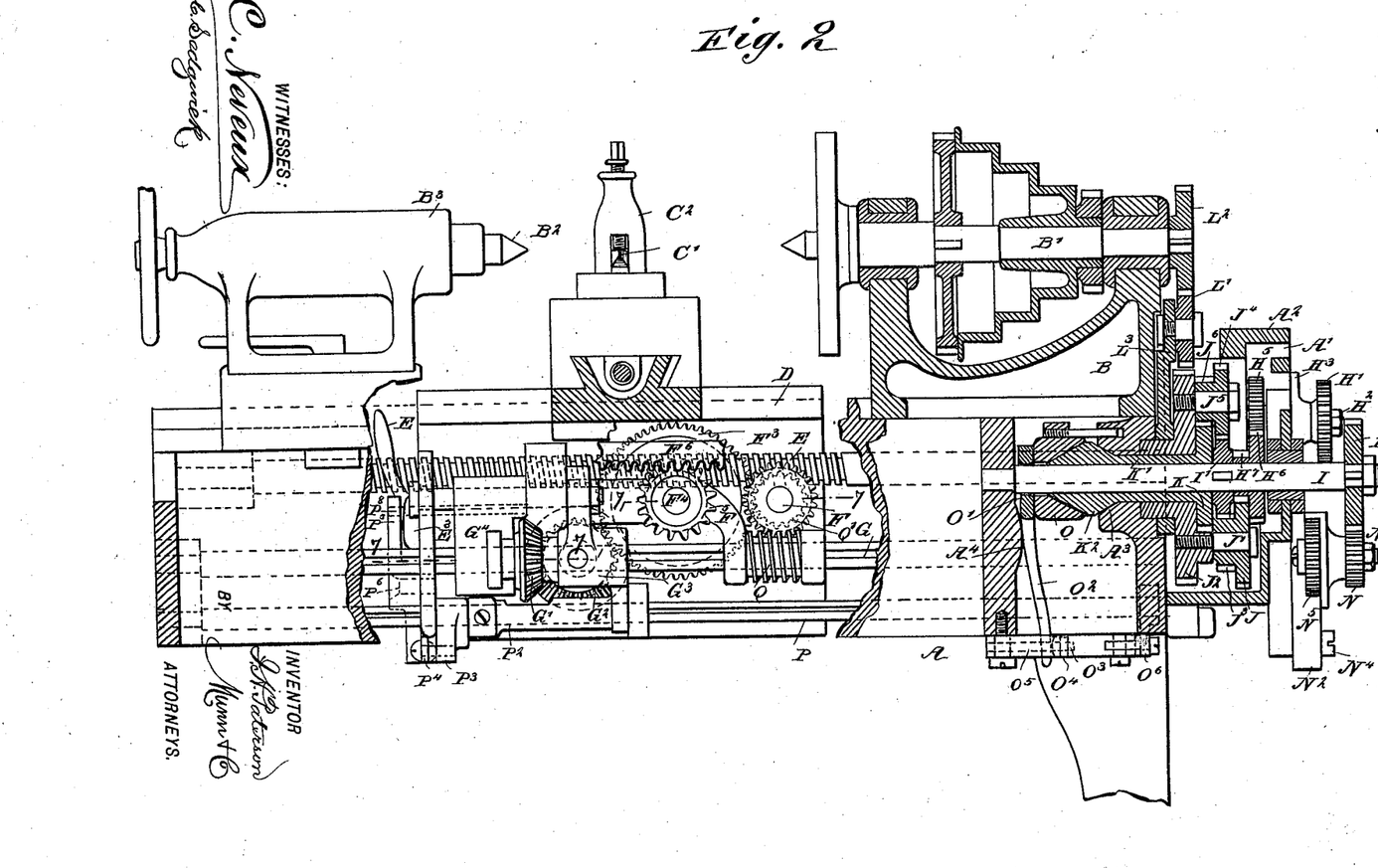
Fig. 2 is a rear sectional elevation of the same on the line 2—2 of Fig. 3.

In order to impart a rotary motion to the shaft I from the gear wheel J² driven from the spindle B', I provide the face of the said gear wheel J² with a stud J⁵ on which is mounted to rotate a gear wheel J⁴ in mesh with a gear wheel I' secured on the said shaft I, see Fig. 2. On the hub of the gear wheel J⁴ is formed a pinion J⁶ in mesh with the gear wheel K previously mentioned and adapted to be held temporarily stationary by a mechanism hereinafter more fully described, so that the pinion J⁶ in rolling off on this gear wheel K causes the gear wheel J⁴ to impart a rotary motion to the gear wheel I', thus rotating the shaft I. A rotary motion can also be given to the shaft I from the shaft G, so that the speed of the pinion J³ rolling off on the gear wheel I' is affected, and consequently the speed of the feed shaft E, as the said pinion J³ is in the train of gear wheels connecting the shaft E with the spindle B' as above described.

On the outer end of the shaft I is secured a gear wheel I² in mesh with a gear wheel N secured on a short shaft N' mounted to turn in suitable bearings formed in a segmental arm N² hung loosely on the shaft G and formed with a segmental slot N³ engaged by a bolt N⁴ fastened on the frame and serving to secure the said segmental arm N² in place to hold the gear wheel N in mesh with the gear wheel I². On the inner end of the shaft N' is secured a gear wheel N⁵ in mesh with a gear wheel N⁶ secured on the shaft G previously mentioned. Thus, when the shaft I is rotated the gear wheel I² imparts a rotary motion to the gear wheel N to revolve the shaft N' which, by the gear wheel N⁵, imparts a rotary motion to the gear wheel N⁶, thus rotating the shaft G, for running the carriage backward by power. But when the shaft G is rotated from the forwardly moving carriage as previously explained then the said train of gear wheels connecting the said shaft G with the shaft I rotates the latter to govern the speed of the pinion J³ and that of the feed shaft E. The segmental arm N² is made adjustable so as to permit of interchanging the gear wheels I² and N, according to the speed desired to be given to the feed shaft E.

In order to control the gear wheel K from the handle E⁴ for the purpose above described, I provide the following device: On the inner end of the hub K' of the gear wheel K, is formed a conical offset K² adapted to be engaged by a similarly-shaped friction collar O, to press the said offset K² in engagement with a conical recess A³ formed on the end of the bed A, see Fig. 2. The collar O is mounted to slide and is concentric with the shaft I, the inner end of the said collar being engaged by a disk O' formed with a handle O² extending downwardly and adapted to rest against an offset A⁴ formed in a partition of the bed A, the said offset A⁴ being the fulcrum for the arm O² when the lower end of the latter is pulled inward to cause the disk O' to press the collar O so as to clutch the offset K² to hold the wheel K stationary. In order to operate this clutch mechanism, I connect the lower end of the arm O² with a link O³ provided with nuts O⁴ engaging the outer side of the lower end of the arm O². The link O³ is pivotally connected with a bell crank lever O⁵, see detail Fig. 5, fulcrumed on the under side on the bed A and pivotally-connected by a link O⁶ with a crank arm P' held on a shaft P mounted to turn in suitable bearings on the front side of the bed A below the shaft G, as plainly shown in Fig. 8. A sleeve P² is mounted to turn with and to slide on the said shaft P and is held between offsets extending from the carriage D; see Fig. 2, so that the said sleeve moves forward and backward with the carriage without disengaging the shaft P. On the sleeve P² is secured a crank arm P³ pivotally-connected by a link P⁴ (see Fig. 6), with a lever P⁵ fulcrumed at P⁶ on the outer end of the carriage D. The upper end of this lever P⁵ is formed with a slot P⁷ engaged by an eccentric pin P⁸ projecting from the outside of the hub E³ previously mentioned, so that when the handle E⁴ of the said hub is turned a swinging motion is given to the lever P⁵ which, by the link P⁴ and crank arm P³, imparts a turning motion to the shaft P, whereby a swinging motion is transmitted by the crank arm P' and link O⁶ to the bell crank lever O⁵ to exert a rearward pull on the lower end of the arm O² to cause the disk O' to move the friction collar O forward to clutch the offset K² of the gear wheel K for the purpose above described.

When it is desired to give an ordinary feed to the carriage D for other than screw cutting purposes, I provide the following device; the said feed being actuated from the shaft G which is provided with a worm Q mounted to turn with and to slide on the said shaft G (see Figs. 2 and 7.) This worm Q is held between projections of the carriage D so that the forward and backward movement of the latter carries the worm wheel forward and backward on the shaft G without, however disengaging the same. The worm Q is in mesh with a worm wheel Q' mounted to rotate loosely on the cone-shaped end F⁷ of the hub of the gear wheel F², the said worm wheel being adapted to be pressed in sufficient frictional contact with the said end F⁷, so as to rotate the gear wheel F² to cause a like movement of the gear wheels F³ and F⁵, whereby the latter on rolling off on the rack F⁶, imparts a sliding motion to the carriage D, the handle G⁷ being then in an uppermost position. The worm wheel Q' is pressed in contact with the end $F^7$ by the head $F^8$ of the shaft F engaging the inner face of the said worm wheel, and on the front end of the said shaft screws a nut $F^9$, to draw the said shaft F outwardly, the said nut abutting on the outer end of the hub of the gear wheel $F^2$. By this arrangement the worm wheel $Q'$ is locked to the gear wheel $F^2$ and rotary motion given to the shaft G is thus transmitted by the worm Q to the worm wheel $Q'$ and wheels $F^2$, $F^3$ and $F^5$, as before described.

Figure 11:
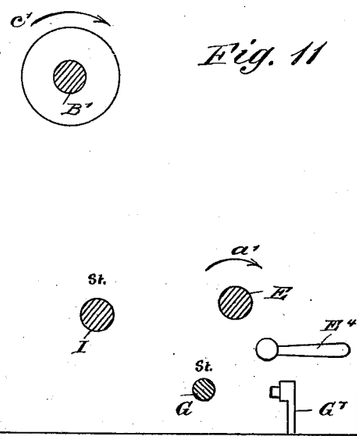
Figure 12:
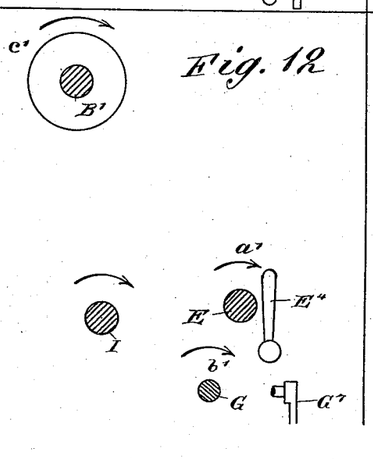

The operation is as follows: The gearing is arranged so that the lathe cuts a thread of a number per inch, which number is not a multiple of the number of threads per inch, on the feed shaft E. Now when the several parts are in the position, as illustrated in Fig. 1, and the spindle $B'$ is rotated in the usual manner, with lever $E^4$ down and nut $E'$ in arrangement with feed shaft E, then the carriage D moves from the right to the left and the tool $C'$ cuts a thread on the work C. Now, when the tool is at the end of the cut, the operator throws the lever $E^4$ up with his right hand so as to disengage the nut $E'$ from the feed shaft E, thus stopping farther travel of the carriage D, and consequently of the tool $C'$. The latter is now run out away from the work in the usual manner and then the operator can return the carriage D by hand on turning the lever $F'$ or he can throw the handle $E^4$ up so as to actuate the clutch mechanism connected with the shaft I, whereby a rotary motion is given to the shaft G in the direction of the arrow $b'$, see Fig. 12, to cause a return movement of the carriage D at a higher rate of speed than it had on the forward one. When the carriage D has been run back sufficiently then the tool $C'$ is again run in to the beginning of the cut, after which the handle $E^4$ is again moved to its regular lowermost position to connect the nut $E'$ with the feed shaft E, it being understood that the manipulation of the handle $E^4$ again releases the clutch mechanism on the shaft I, as previously described, so that the carriage D is again moved forward with the tool in the cut, and at a speed corresponding to the differential speed of the pinion $J^3$, in mesh with the revolving gear wheel $I'$ turned by the gearing connecting the shaft I with the shaft G. It will be seen that by this arrangement no backing belt or any other means are necessary to catch the thread on the work C whether the said thread is or is not a multiple of the number of threads per inch on the shaft E or an exact whole number or any fractional part of a number of threads per inch, such as eleven, eleven and one-half, ten and one-third, thirteen and one-fifth, &c. It is understood that the lathe is in motion so that the spindle $B'$ rotates in the direction of the arrow $c'$ in Figs. 10, 11, 12 and 13, the gear wheel $L^2$, secured to the spindle $B'$ through the gear wheels $L'$ and L imparts a rotary motion to the large gear $J^2$ so that the pinion $J^3$ is carried around the gear wheel $I'$. Now when the lever $E^4$ is up in a horizontal position so that the half nut $E'$ is disengaged from the feed shaft E, the carriage D remains stationary so that the gear wheel $F^5$ in mesh with the fixed rack $F^6$ must remain stationary also, and the gear $F^7$ being connected by gearing as before described to the shaft G, the latter will remain stationary also as illustrated in Fig. 11. Then the shaft G being stationary and connected by the gears $N^6$, $N^5$ and N to the gear wheel $I^2$ secured on the outer end of the shaft I, the latter must remain stationary, as illustrated in Fig. 11, so that the gear $I'$ being stationary imparts a rotary motion to the gear $J^3$ by the latter rolling off on the gear $I'$ when the gear $J^3$ is carried around the gear $I'$ by the rotary motion of the gear $J^2$. The gear $J^3$ being rotated in the manner above described gives rotary motion through the gear J which is secured to the hub of the gear $J^3$, to the pinion $H^7$, the latter giving rotary motion to the feed shaft as before described, in the right proportion to cut a number of threads per inch, that is, a multiple of the number of threads per inch on the feed shaft, so that the lever $E^4$ can be thrown down so as to engage the half nut $E'$ with the feed shaft E, at any place, but when the lever $E^4$ is thrown down and the nut $E'$ is in engagement with the feed shaft E, the carriage D moves from right to left. The gear wheel $F^5$ being secured to a shaft $F^4$ mounted in bearings forming part of the carriage D, is moved with the carriage D along the rack $F^6$, the gear $F^5$ rolling off the rack $F^6$ is caused to rotate, and the gear $F^5$ through the gears $F^3$ and $G^3$, and the bevel gears $G^2$ and $G'$, causes the shaft G to rotate, which, through the gears $N^6$, $N^5$, N and $I^2$ imparts rotary motion to the shaft I, so that when the lever $E^4$ is down and the half nut $E'$ is in engagement with the feed shaft E, the shaft I is caused to rotate in the manner above described, and the gear wheel $I'$ being secured to the shaft I imparts motion to the gear wheel $J^3$, in the right direction and proper proportion to decrease the speed of the feed shaft E so as to cut a finer thread according to the number of teeth in the interchangeable gears N and $I^2$. In case the carriage D in running back should strike the tail stock $B^3$, the said carriage will stop without any damage, as the change of motion is accomplished by the friction clutch and no gear or gear wheels are thrown in or out of gear. The advantage of this is that the tool can be thrown back or forward either by the ordinary hand wheel of the ordinary lathe or it can be moved back or forward by the same handle $E^4$ that opens or closes the nut on the feed shaft, without the operator being obliged to change the hand from the handle to the hand wheel, at each stroke of the tool. When the handle $E^4$ is up and the nut $E'$ disengaged from the feed shaft, then the latter is making the proper number of revolutions to cut a number of threads per inch that will be equal to or a multiple of the number of threads per inch on the feed shaft; therefore, the handle E⁴ can be thrown down and the nut closed on the feed shaft at any place so that the tool will catch the thread in the right place, but as soon as the nut is closed on the feed shaft the carriage D begins to move forward and carries with it the gears in the carriage D, which are geared into the rack F⁶, so as to cause the gears to revolve as previously explained, it being understood that the train of gear wheels are set in motion by the gear wheel F rolling off the fixed rack F⁶ as soon as the carriage D begins to move. The feed shaft is thus caused to revolve in the right proportion to the number of threads to be cut. By changing the gear wheels N and I² more or less speed can be given to the shafts E and G respectively, so as to cut a greater or less number of threads to the inch on the work C in the lathe. By shifting the lever G⁷ the gear wheel G' can be moved out of mesh with the gear wheel G² so that the rotary motion of the shaft G does not affect the train of gear wheels in the carriage D. This is done when the lathe is not to be used as a screw cutting lathe, but for ordinary work, it being understood that the gear wheels H and H' are then thrown out of mesh by shifting the arm H³ to the position shown in Fig. 9. A toothed block H⁸ fixed on the casing A' then engages the gear wheel H⁵ to lock the same, and cause the gear wheel J to roll off on the gear wheel H⁷. The shaft I is then rotated from the spindle B' in the inverse direction of the arrow b' and a like movement is given to the shaft G while the shaft E remains stationary. The worm wheel Q' is then locked to the hub of wheel F² as before described, so that the shaft G by the worm Q, worm wheel Q', gear wheels F², F³ and F⁵ and fixed rack F⁶, causes the carriage D to travel on the bed A. The beveled gear wheel G' has previously been moved out of mesh with the beveled gear G², by the operator moving the handle G⁷ into an uppermost position, as previously explained (see Fig. 13).

Having thus described my invention, what I claim as new, and desire to secure by Letters Patent, is—

1. A screw cutting lathe, provided with a mechanism intermediate of the feed shaft and the spindle, and provided with an auxiliary shaft driven from the moving carriage, and geared with the feed shaft to cause the latter to rotate at a different rate of speed than that otherwise given to the feed shaft by the spindle, substantially as shown and described.

2. A screw cutting lathe provided with an intermediate mechanism between the feed shaft and spindle, and comprising an auxiliary shaft, gearing for driving the said shaft by the moving carriage, a second shaft geared with the said auxiliary shaft, and a gear wheel secured on the said second shaft and in mesh with a pinion of the gearing connecting the feed shaft with the spindle, substantially as shown and described.

3. A screw cutting lathe comprising a revoluble spindle, a feed shaft, gearing for driving the said feed shaft from the said spindle, a carriage adapted to be connected with the said feed shaft, an auxiliary shaft adapted to be driven from the said carriage, a second shaft geared with the said auxiliary shaft, and a gear wheel secured on the said second shaft and in mesh with one of the pinions of the said gearing connecting the feed shaft with the said spindle, substantially as shown and described.

4. A screw cutting lathe comprising a revoluble spindle, a feed shaft, gearing for driving the said feed shaft from the said spindle, a carriage adapted to be connected with the said feed shaft, an auxiliary shaft adapted to be driven from the said carriage, a second shaft geared with the said auxiliary shaft, a gear wheel secured on the second shaft and in mesh with one of the pinions of the said gearing connecting the feed shaft with the said spindle, a half nut held on the carriage and adapted to engage the said feed shaft, and a lever for moving the half nut in or out of engagement with the said feed shaft, substantially as shown and described.

5. A screw cutting lathe, comprising a revoluble spindle, a feed shaft, gearing for driving the said feed shaft from the said spindle, a carriage adapted to be connected with the said feed shaft, an auxiliary shaft adapted to be driven from the said carriage, a second shaft geared with the said auxiliary shaft, a gear wheel secured on the said second shaft, and in mesh with one of the pinions of said gearing connecting the feed shaft with the said spindle, a half nut held on the carriage and adapted to engage the said feed shaft, a lever for moving the half nut in or out of engagement with the said feed shaft, and clutch mechanism actuated from the said lever and adapted to lock or release the said second shaft, substantially as shown and described.

6. In a screw cutting lathe, the combination with a gear wheel adapted to be driven from the spindle, of a shaft carrying a gear wheel, a pinion held on a stud secured on the said driven gear wheel, in mesh with the said shaft gear wheel, and a gearing for connecting the said pinion with the feed shaft to impart a rotary motion to the latter, substantially as shown and described.

7. In a screw cutting lathe, the combination with a gear wheel adapted to be driven from the spindle, of a shaft carrying a gear wheel, a pinion held on a stud secured on the said driven gear wheel, in mesh with the said shaft gear wheel, a gearing for connecting said pinion with the feed shaft to impart a rotary motion to the latter, a clutch gear wheel held loosely on the said shaft, a second pinion in mesh with the said clutch gear wheel, the pinion being mounted on a stud of the said first named driven gear wheel, and a gear wheel carrying on its face the last named pinion and in mesh with the said shaft gear wheel, substantially as shown and described.

8. In a screw cutting lathe, the combination with a gear wheel adapted to be driven from the spindle, of a shaft carrying a gear wheel, a pinion held on a stud secured on the said driven gear wheel, in mesh with the said shaft gear wheel, a gearing for connecting the said pinion with the feed shaft to impart a rotary motion to the latter, a clutch gear wheel held loosely on the said shaft, a second pinion in mesh with the said clutch gear wheel, the pinion being mounted on a stud of the said first named driven gear wheel, a gear wheel carrying on its face the last named pinion and in mesh with the said shaft gear wheel, an auxiliary shaft, a second gearing for connecting the first named shaft with the said auxiliary shaft, and a third gearing connecting the auxiliary shaft with the carriage, substantially as shown and described.

9. In a screw cutting lathe, the combination with a gear wheel adapted to be driven from the spindle, of a shaft carrying a gear wheel, a pinion held on a stud secured on the said driven gear wheel, in mesh with the said shaft gear wheel, a gearing for connecting the said pinion with the feed shaft to impart a rotary motion to the latter, a clutch gear wheel held loosely on the said shaft, a second pinion in mesh with the said clutch gear wheel, the pinion being mounted on a stud of the said first named driven gear wheel, a gear wheel carrying on its face the last named pinion and in mesh with the said shaft gear wheel, an auxiliary shaft, a second gearing for connecting the first named shaft with the said auxiliary shaft, and a third gearing connecting the auxiliary shaft with the carriage, and a clutch mechanism for controlling the said clutch gear wheel, substantially as shown and described.

JAMES HERBERT PATERSON.

Witnesses:
THEO. G. HOSTER,
C. SEDGWICK.